Dec. 19, 1967  D. F. STEDMAN  3,358,923
CONTROL APPARATUS

Filed May 17, 1965  2 Sheets-Sheet 1

Inventor
Donald F. Stedman

Stevens, Davis, Miller & Mosher
Attorneys

Dec. 19, 1967   D. F. STEDMAN   3,358,923
CONTROL APPARATUS
Filed May 17, 1965   2 Sheets-Sheet 2
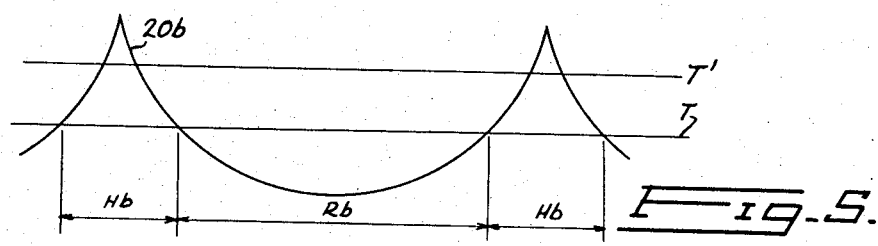
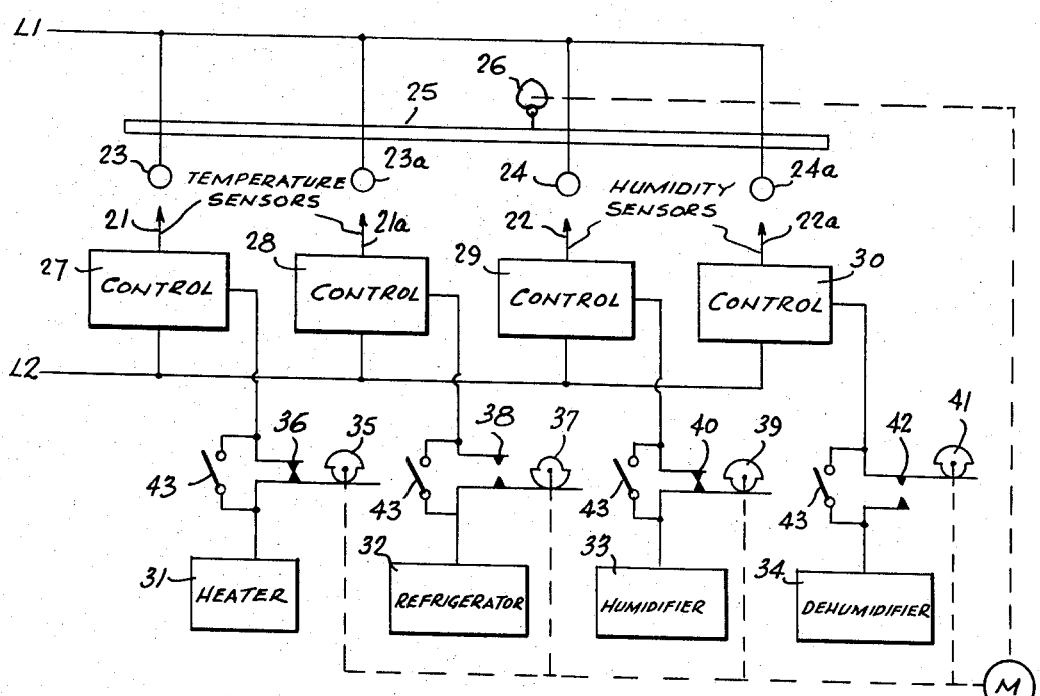
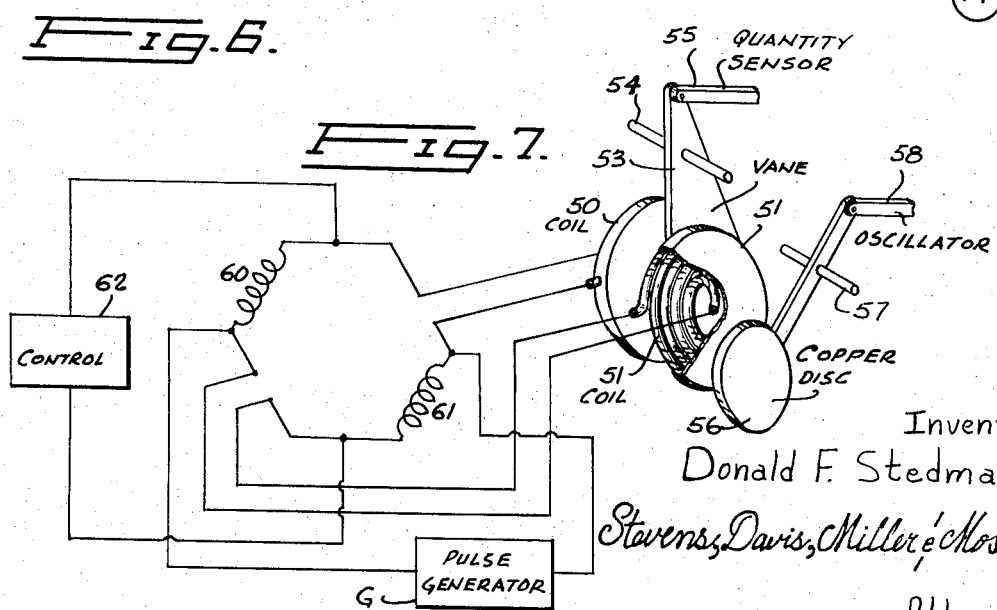
Inventor
Donald F. Stedman
Stevens, Davis, Miller & Mosher
Attorneys

United States Patent Office 3,358,923
Patented Dec. 19, 1967

3,358,923
CONTROL APPARATUS
Donald F. Stedman, Ottawa, Ontario, Canada, assignor to Canadian Patents and Development Limited, Ottawa, Ontario, Canada, a corporation of Canada
Filed May 17, 1965, Ser. No. 456,363
9 Claims. (Cl. 236—46)

ABSTRACT OF THE DISCLOSURE

An apparatus and method for controlling the value of a physical quantity, such as temperature or humidity, by applying a Gouy type oscillation to the value with phase discrimination of the Gouy type oscillation.

---

This invention relates to apparatus for controlling the value of a controllable physical quantity for the maintenance of such value close to a predetermined level, such apparatus including suitable correcting means capable of varying the quantity in either sense.

An example of a quantity that is often required to be closely controlled is temperature. Although, as will become evident from the description below, the present invention is also applicable to the quantitative control of any modular physical property of an environment, such as humidity, acidity, and salinity, to name just a few such physical quantities, the invention will be primarily exemplified with reference to the control of temperature, since this is a typical and readily described use of the invention, and since an understanding of the invention will be facilitated by the adoption of this example.

This invention will be described in a simple mechanical form, but the equivalent functions in solid state or vacuum electronics or employing other standard engineering methods are also within this invention, since the principle is the same in mechanical or electronic adaptations.

Fundamental to the control of a temperature (as to the control of any controllable modular physical quantity) is the provision of a detector for sensing the value of the temperature, so that heating can be provided when the temperature is lower than a desired temperature, and cooling can be provided when it is higher than the desired temperature. A system operating solely on this basis, however, leads in practice to a substantial measure of overshooting and produces temperature fluctuations oscillating from too low to too high a temperature.

An improvement over the simple employment of a detector is afforded by the Gouy system, which is now well known, but which will be described in some detail, since the present invention comprises an improvement thereon.

The Gouy method of control is to insert a deliberate oscillation into the detecting system and this oscillation may be introduced either mechanically, electrically, or thermally; and it may be applied either to the control system, the sensor or its immediate environment.

Since it will be convenient to describe the prior art Gouy control method by means of illustrations, a list of the appended drawings will now be set out. These drawings show examples of both the Gouy system and such a system modified by the present invention. It is to be understood that these drawings and the specific description relating thereto are provided by way of example only, and not as limitation of the scope of the present invention, which latter is defined in the appended claims.

In the drawings:

FIGURE 5 is a variant of FIGURE 4;

FIGURE 6 shows diagrammatically a typical circuit embodying the invention; and

FIGURE 7 shows a perspective view of a structural detail.

Figure 1:
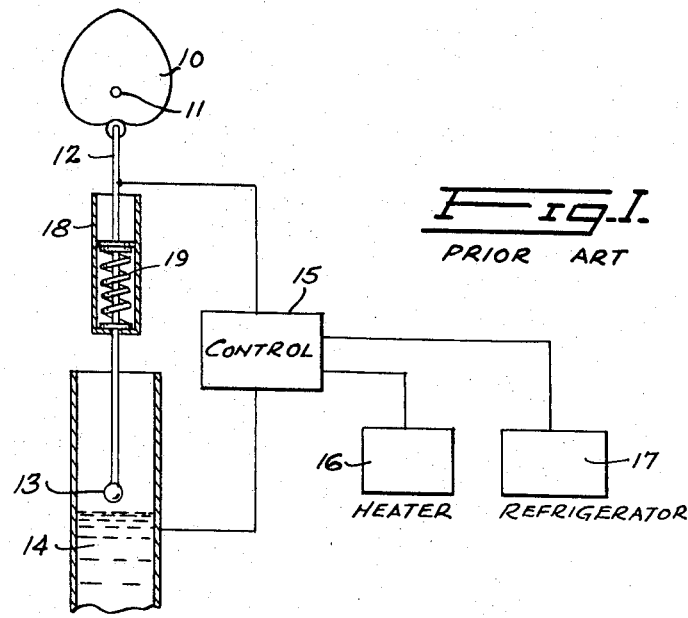
FIGURE 1 is a diagrammatic representation of a conventional Gouy system.
Figure 2A:
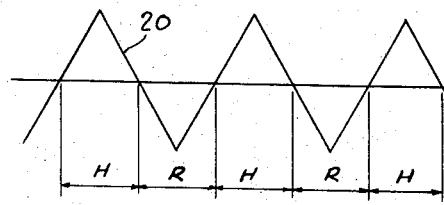
FIGURES 2a and 2b are diagrams illustrating the operation of the FIGURE 1 system.
Figure 2B:
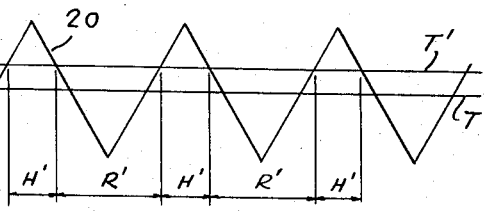

FIGURE 1 demonstrates diagrammatically an elementary form of the Gouy system, wherein a cam 10 rotating about a shaft 11 acts to oscillate a cam-following rod 12 bearing a contact 13 for cooperation with temperature sensing means in the form of a body of mercury 14 in a thermometer. Rod 12 and mercury 14 are connected electrically to a control 15 which energizes either a heater 16 or a refrigerator 17, depending upon the quantity called for. Rod 12 is guided in support 18 and is urged against cam 11 by a spring 19. When, as shown, the contact 13 is not making electrical contact with the mercury 14, the control 15 calls for heating; when these parts are in contact, the control 15 calls for cooling. Continuous relative oscillation between the contact 13 and the mercury 14 has the result illustrated in FIGURE 2a, where the zig-zag line 20 represents the relative vertical movement of the contact 13, converted to the equivalent temperature bases. Temperature T is the desired temperature level to be maintained and temperature T' is the actual momentary temperature value of the apparatus to be controlled. FIGURE 2a shows the conditions when the space under control is in fact at temperature T, i.e. T=T', and assuming no thermal load on the system, the periods of heating H then being equal in length to the periods of refrigeration R. Should the actual temperature T' increase, as shown in FIGURE 2b, the effect will be that the heating phases H' are shortened, while the refrigeration phases R' are lengthened. The result, assuming the relative powers of the heater and refrigerator are equal, is obviously a net cooling, tending to restore T' towards T. When T' falls below T, the reverse effect is achieved, with the heating phases lengthened and the refrigeration phases shortened, although depending on the relative power used in the two phases and any actual thermal load on the system the final balance may not be exactly at the midpoint.

In FIGURES 2a and 2b, the curves 20 have been shown as consisting of straight lines. If preferred, the movement of the contact 13 may follow a simple harmonic motion, in which case the curves 20 will be sine waves, more or less flat topped. Conversely, the peaks of the curves 20 may be extended still more as narrowed points to give particularly delicate control at maximum deviations. Any required shape can be chosen for the curves 20 by suitable shaping of the cam 10, provided the lengthening and shortening of the heating and refrigerating phases is proportional to the degree of deviation of the sensed value from the desired value. In other words, as T' increases the length of phases H' decreases and of phases R' increases and vice versa. In this connection in this document the reference to these variations being "proportional" is not intended to imply a straight line proportionality. The function may be more complex than this, as it will be for example whenever the oscillation is other than straight line.

It may also be conveniently stated at this point, for the purposes of providing clear antecedents for the terminology of the claims, that, in the specific example provided, the curve 20 represents a "selected level" to which the lengths of the control phases (heating and cooling) are related, and that this selected level is oscillated about a "predetermined level," represented by the temperature T. The temperature T' represents the "sensed value" of the temperature.

Without the Gouy oscillation the environment to be controlled and the controller will together have a natural period of oscillation, the controlled temperature rising and falling a fairly regular amount in a regular cycle. To improve the control the Gouy oscillation must be markedly faster, preferably at least 2 or 3 times faster, than this natural period of oscillation, and the magnitude of the Gouy oscillation must not be much less than the natural rise and fall of the temperature; otherwise, following any loading disturbance, if temperatures at any time start oscillating, the Gouy control will not quench this natural tendency.

It will also be appreciated that with such an oscillation, if for example some part of the controlled environment were to emit extra heat, this would cause the ultimate balance point, within the Gouy oscillation, to change, so that there will result more cooling and less heating to balance the temperature again. In effect, therefore, although the temperature may still be firmly controlled, it can drift at different times an amount virtually equal to the Gouy oscillation, which to provide adequate stability, must be a major fraction of the natural variation.

The Gouy control system provides better control than a simple on-off contact arrangement and has been widely adopted, but when the quantity under control is more difficult to regulate than temperature, for example relative humidity, the conditions are often so severe that the Gouy oscillation must be very large. Control of humidity and other quantities, especially if related to a small environment, still leaves much to be desired even using the Gouy oscillation method.

Figure 3:
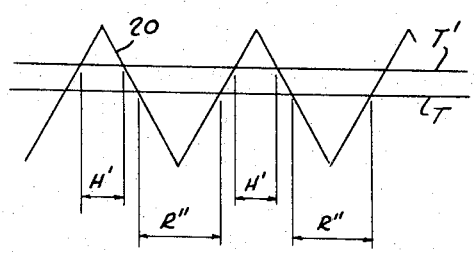
FIGURE 3 is a diagram similar to FIGURE 2b, but modified according to the present invention.

In order to simplify initial discussion of the present invention, the case will be considered in which, to maintain standard conditions, equal operation of both cooling and heating phases is required, as shown in FIGURE 2. The present invention achieves an improvement in the Gouy system by applying a limitation to the duration of one or both of the series of operating phases needed to bring the controlled quantity back to standard condition. For example, in the circumstances shown in FIGURE 2b where cooling of the temperature T' is required, the invention, in one of its forms, provides for limitation of the maximum duration of the refrigerating phases R', in this example to 180°, namely half the cycle while imposing no minimum duration on either the heating phases H' or the refrigerating phases R'. Then even if still more cooling is called for by the momentary temperature T' rising still higher above T, this duration of the cooling phase is not exceeded, as would be the case with a simple oscillating Gouy control. What happens is that further control is obtained only by further reducing the operation of the heating part of the cycle, as is normal with the simple oscillator. This effect is shown in FIGURE 3 which is the same as FIGURE 2b, except that the refrigerating phases R" are now restricted to a maximum of half the total cycle time. A form of practical apparatus whereby such restriction can be applied will be described below.

At first sight this reduction in the maximum duration of refrigeration would seem to be the opposite of that required, since it is cooling that is more strongly needed the further T' exceeds T, in order to bring the actual temperature T' back to standard. On the other hand, the length of the refrigerating phases R" is in any case greater than the length of the heating phases H', so that a net cooling results. The difference in practical effect over the conventional Gouy system is that the modified apparatus maintains the cooling at the same level, irrespective of any increased demand (beyond a certain amount), for more cold; but less and less heat is supplied. For example, if the temperature T' were still further to increase, the effect would be a further shortening of the heating phases H' (until these ultimately became zero) with the length of the refrigerating phases R" remaining constant. It is, of course, necessary under these conditions that the capacity of the refrigerating equipment be sufficient to lower the temperature of the space under control operating only during half the cycle time.

It has been found from practical experiments that this method of preventing an increase in the length of the refrigerating phases, when an excess of cooling is called for, substantially reduces undesirable overshooting of the temperature under control. These effects all apply in reverse when the momentary temperature T' drops below the desired temperature T. The heating phases are then restricted to half the cycle time, while the refrigerating phases are reduced in length proportionately to the extent by which the temperature T' differs from the temperature T. It should also be mentioned that the principle of the present invention is equally applicable to Gouy systems in which the shape of the curve 20 differs from that shown in FIGURE 3, as will be explained in further detail below in connection with FIGURE 5.

Figure 4:
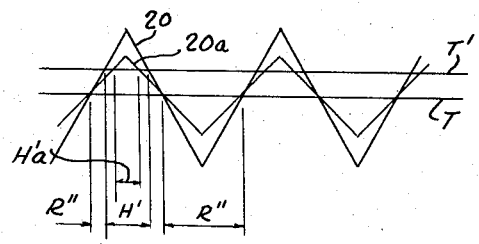
FIGURE 4 is a variant of FIGURE 3.

It will be appreciated that the control sensitivity provided by a system having the limitations shown in FIGURE 3, is only half that provided by an unmodified Gouy system, since, as the temperature T' increases only one of the functions (heating) is controlled, the refrigerating function already being "full on." This factor is offset, however, by the fact that with the present invention a smaller Gouy oscillation amplitude is found to be adequate for stability, and this amplitude reduction in turn yields a corresponding increase in the control sensitivity, which results in more reliable temperature control under all conditions. This point is illustrated in FIGURE 4, which shows a curve 20a representing an oscillation of approximately half the amplitude of the oscillation 20. It will be observed that, with T' greater than T, the length of the refrigeration phases R" always remains the same, since they are limited to half the cycle time. On the other hand, the effect of reducing the amplitude of oscillation has reduced the length of the heating phases from H' to Ha'. The sensitivity (change of control effect per degree of deviation) is thus increased, any further increase in the value of temperature T' obviously having a doubly rapid effect in diminishing Ha' than in diminishing H'. The present invention, by enabling a reduced amplitude of Gouy oscillation to be used with retention of acceptable stability, thus provides an increase in the sensitivity of the control of one variable (e.g. heat), to offset the loss of sensitivity flowing from limitation of the control of the other variable (cold). These considerations are equally applicable when the conditions are reversed.

It will also be observed that with this limiting method a dead period is provided between the operation of heating and cooling, and that, as the momentary temperature approaches the limits of Gouy control (at the peaks of the cycles), this dead period is increased continuously. During this dead period no control function is operating at all, and the environment to which control is provided is therefore settling down to a net average condition appropriate to all the control which has previously been applied, and is not responding to any individual phase.

It is not fundamental to the present invention that the limitation in the length of each of the control phases should be for half that of a full cycle. While 180° is a convenient value to choose, other arbitrary limits can be adopted. In general, the fraction of a cycle to which a control is limited is chosen as related to the relative power of the two controls. If one of the controls is markedly greater in power than the other, the greater power may be limited to a smaller fraction of the cycle, since a high powered control tends to exaggerate the tendency to overshoot; conversely a smaller power can safely be allowed to operate over more than one half of the cycle. Moreover, with control means of different powers, it may be convenient to adopt different proportionalities between quantity deviation and the length of the operating phases, in other words an asymmetrical curve. An example of this possibility is shown in FIGURE 5 where it is assumed that the heater is of higher power than the refrigerator. It would then be convenient to shape the oscillating cam (or equivalent electronic control) to produce the curve 20b, sharply peaked on the heating side and a flattened curve on the cooling side. The heating phase could then conveniently be limited to the lengths Hb (about 120° of a 360° cycle) and the cooling phases to lengths Rb (about 240°).

Taking another example, if humidity is to be controlled to reach close to either zero or 100%, real overshooting of the limit is physically impossible and values close to the limit may prove rather difficult to achieve or maintain. In this special case therefore the phase operating towards the limit may in general be allowed full operation within the cycle without any limitation, while the opposing control, even if of only relatively low power is often best limited to only a small part of each cycle. This is a case where only one series of phases will be limited in duration.

In general, therefore, each control in any specific application will be limited to an amount fully able to provide the required controlled conditions, but not much more than is adequate for this purpose.

It will also be appreciated that, when cycle limitations are applied to the opposing control functions, these are quite independent of each other. Both, for instance, may be limited to 90° of the cycle, in which case two dead periods of 90° each occur in each cycle; or conversely both could be allowed to operate over 270° of each cycle. In this case no dead period would occur unless overshooting became quite pronounced close to the peak of each cycle.

FIGURE 6 shows one manner of achieving the effect of limiting to 180° all sets of phases in control apparatus for temperature and humidity. A pair of temperature sensors 21, 21a, and a pair of humidity sensors 22, 22a, are shown. In practice, a single sensor reading plus and minus for each physical quantity may be all that is needed, but it is convenient for the purpose of illustration to show each sensor as two, since it will perform a dual role. Co-operating contacts 23, 23a, 24, 24a, are oscillated in unison by a bar 25 acted on by a cam 26 driven by a motor M. Power supply L1, L2 actuates each of four controls 27, 28, 29, 30, when the respective sensors and their cooperating contacts close.

Control 27 is arranged to energize heater 31 when contacts 21, 23 are open; control 28 to energize refrigerator 32 when contacts 21a, 23a are closed; control 29 to energize humidifier 33 when contacts 22, 24 are open; and control 30 to energize dehumidifier 34 when contacts 22a, 24a are closed. Limitation of the operation of heater 31 to 180° of the cycle time is effected by cam 35 acting on contacts 36 in the circuit from control 27 to heater 31. Similarly a cam 37 operates contact 38 in the circuit to refrigerator 32; a cam 39 and contacts 40 are in the circuit to humidifier 33; and a cam 41 and contact 42 in the circuit to dehumidifier 34. Cams 35, 37, 39 and 41 are all driven in synchronism with each other and with the cam 26 by the motor M, and override switches 43 are conveniently provided in these circuits to facilitate bringing the system quickly up to any desired condition, or for the maintenance of extreme conditions if needed.

In FIGURE 6 it will be convenient that the cams 35, 37, 39 and 41 be formed as sector cams in order to allow adjustment of the fraction of each cycle over which each control may be limited, as already discussed. In other words these cams are each formed of two leaves which may be rotated relative to each other and then clamped so that the large part of each cam can be 180° or more as desired. The apparatus is not limited to any particular type of cam, these cams providing simple illustration. As shown, the heater and refrigerator can be operated for 180° or less, since switches 36 and 38 are "normally closed." Alternatively, as shown in FIGURE 6 for the humidity control (in which the cams 39 and 41 are in the same phase) while switch 40 is a "normally closed" type, switch 42 is "normally open," providing the opposing operation of these functions. As shown, therefore, the humidifier can, by adjustment of the sector cams to enlarge the rise portions of the cams, operate for 180° or less, while the dehumidifier can be adjusted to operate for 180° or more. These details are used only for illustration, since the type of cam and switch arrangement does not affect the principle of operation of the method. Provided the system provides the proper phase limitation described, sliding, tapered, spiral or any other type of variable cam or switching method, mechanical or electronic, can be employed.

When applied to a simple control quantity, such as temperature, the control by this method is virtually absolute, e.g. control to .001° C. is not difficult. Temperature control is not very difficult to quite a high degree of accuracy by known methods; but humidity control, when two physical materials, moisture and air, are required to be mixed, is very much more difficult. In a particular test, the same control device that would maintain a room temperature to about .1° C., when set at 60% and used in the same environment to control humidity by the simultaneous use of wet and dry bulb readings, was found to permit an actual variation between about 40% and 90% with a period of a few minutes over the cycle.

When however the phase limitation of this method was used in conjunction with this same control device, with no other change whatever, humidity variation could no longer be detected by independent quick reading thermocouples, i.e. the variation was certainly less than 1%, the recording trace being a smooth line without regard to the cyclic operation of the equipment.

It was noted earlier in this specification that purely electronic methods are interchangeable with the mechanical system described. By standard pulsing and delay circuits the requirements of this invention are readily set up either by solid state or vacuum tube techniques.

FIGURE 7 shows a fragment of a system operating according to another aspect of the invention. In practice, it is usually preferred to employ some form of electrical actuator, rather than the simple mercury thermometer used to demonstrate the invention in FIGURE 1. For example, a pair of spiral coils 50, 51 may be connected in opposing relation in two arms of a bridge containing balance arms 60 and 61, and supplied with high frequency pulses from pulse generator G. Between the coils 50, 51 there is mounted an electrically conducting vane 53 rotatable about axis 54 by an arm 55 coming from a standard quantity sensor. At a certain, generally central position, such as that shown in FIGURE 7, the bridge is balanced. Pivotal movement of the vane 53 one way unbalances the bridge in one sense, the other way in the other sense. Such effects correspond respectively to closing and opening of the contacts 21, 23, the bridge acting on a control 62. The arrangement in FIGURE 7 so far described is conventional and consequently no further details are deemed necessary. In order to keep the coils 50, 51, small, with no iron cores, they are energized with a rather high voltage and a high frequency. It is convenient, and is commonly done, to use an induction coil as the generator G for the purpose. This produces an extremely irregular series of high frequency pulses, into which it is now desired to introduce a very small and regular oscillation. This can be done by mechanically moving some parts of the coils 50, 51 or sensor vane 53, but this is extremely delicate. Alternatively the effect can be accomplished by mechanical coupling a variable inductance within the bridge. Since, however, this bridge needs to be fully shielded from external disturbance, such an arrangement adds complexity.

In accordance with another novel and further aspect of this invention, there is provided a non-magnetic, electrically conducting, disc 56 (e.g. of copper) which is mounted to pivot about an axis 57 by an oscillating rod 58. The disc 56, which acts effectively as a short-circuited turn of almost zero resistance, modifies the inductance of the coil it is nearer, e.g. coil 51, more than the other coil to shift the position in which the vane 53 must be in order to balance the bridge. Oscillation of the disc 56 is thus electrically equivalent to the oscillation effected by cam 10 or cam 26, and it is found not to affect the phase of the high frequency bridge pulses to any material degree. Also it is not delicate, does not need shielding from external electrical disturbances, and does not need installation or operation inside the bridge shield.

I claim:
1. In control apparatus for maintaining the value of a controllable physical quantity close to a predetermined level,
    (a) means for increasing said value,
    (b) means for decreasing said value,
    (c) means for applying a cyclic Gouy oscillation to said means (a) and (b),
    (d) and means synchronous with said oscillating means for limiting the maximum duration of actuation of at least one of said increasing and decreasing means to less than a full cycle.

2. In control apparatus for maintaining the value of a controllable physical quantity close to a predetermined level, said apparatus including
    (a) means for increasing said value,
    (b) means for decreasing said value,
    (c) means for sensing said value,
    (d) means cooperating with said sensing means for actuating said means (a) when the relation of said cooperating and said sensing means indicates a momentary value below a selected level and for actuating said means (b) when the relation of said cooperating and said sensing means indicates a momentary value above the selected level,
    (e) means for causing relative oscillation between means (c) and means (d) to cause said selected level to oscillate about said predetermined level whereby cyclically to actuate both means (a) and means (b) during each cycle with the duration of the actuated phases of means (a) relative to the actuated phases of means (b) such that means (a) is less effective than means (b) when the sensed value is above said predetermined level, and vice versa, such change of effectiveness being proportional to the degree of deviation of said value from said predetermined level,
the improvement comprising
    (f) means limiting the maximum duration within the cyclic actuation of each phase of at least one of means (a) and (b).

3. Control apparatus according to claim 2, wherein said means (f) limits the duration of each actuated phase of said one means to approximately half the cycle time.

4. Control apparatus according to claim 2, wherein said means (f) limits the maximum duration of each actuated phase of both means (a) and means (b).

5. Control apparatus according to claim 2, wherein said means (f) limits the duration of each actuated phase of both means (a) and means (b) to approximately half the cycle time.

6. A method of controlling the value of a controllable physical quantity comprising
    (a) sensing said value,
    (b) acting to increase said value when the value sensed is below a selected level,
    (c) acting to decrease said value when the value sensed is above said selected level,
    (d) causing said selected level to oscillate about a predetermined level relative to the value sensed whereby cyclically to act to increase and to decrease said value, with the duration of each of the series of increasing phases relative to the duration of each of the series of decreasing phases acting to enhance the effectiveness of said decreasing action when the sensed value is above said predetermined level, and vice versa, such enhancement of effectiveness being proportional to the degree of deviation of said sensed value from said predetermined value,
    (e) and limiting the maximum duration to less than a full cycle of each phase of at least one of said series of increasing and decreasing phases while imposing no minimum duration on each phase of both said series of increasing and decreasing phases.

7. A method according to claim 6, wherein the phases of said one series of phases are limited to approximately half the cycle time.

8. A method according to claim 6, wherein the phases of both said series of phases are limited in duration.

9. A method according to claim 8, wherein the phases of both said series of phases are limited to approximately half the cycle time.

References Cited

UNITED STATES PATENTS

| | | | |
|---|---|---|---|
| Re. 21,777 | 4/1941 | Kimball | 236—74 |
| 1,998,534 | 4/1935 | Dautel | 236—44 X |
| 2,103,113 | 12/1937 | Hornung | 200—136.3 |
| 2,113,943 | 4/1938 | Kimball. | |
| 2,209,566 | 7/1940 | Hornung | 236—46 X |
| 2,218,464 | 10/1940 | Fairchild | 236—69 |
| 2,778,574 | 1/1957 | Moore et al. | 236—78 |

WILLIAM J. WYE, *Primary Examiner.*

ALDEN D. STEWART, *Examiner.*